(12) United States Patent
Tang et al.

(10) Patent No.: US 7,353,687 B2
(45) Date of Patent: Apr. 8, 2008

(54) REFERENCE LEAK

(75) Inventors: Jie Tang, Beijing (CN); Liang Liu, Beijing (CN); Peng Liu, Beijing (CN); Zhao-Fu Hu, Beijing (CN); Bing-Chu Du, Beijing (CN); Cai-Lin Guo, Beijing (CN); Pi-Jin Chen, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 31 days.

(21) Appl. No.: 11/228,821

(22) Filed: Sep. 16, 2005

(65) Prior Publication Data

US 2006/0144120 A1 Jul. 6, 2006

(30) Foreign Application Priority Data

Jan. 6, 2005 (CN) ............. 2005 1 0032731

(51) Int. Cl.
*G01F 25/00* (2006.01)
(52) U.S. Cl. ....................................... 73/1.16
(58) Field of Classification Search ............... 73/1.16, 73/1.17; 210/510.1
See application file for complete search history.

(56) References Cited

U.S. PATENT DOCUMENTS

| | | | | | |
|---|---|---|---|---|---|
| 2,375,334 A | * | 5/1945 | Valyi et al. | ............... | 29/897.32 |
| 2,499,977 A | * | 3/1950 | Scott | ............. | 148/527 |
| 3,482,703 A | * | 12/1969 | Surprenant et al. | ......... | 210/489 |
| 3,680,576 A | * | 8/1972 | Kiwak | ......................... | 137/833 |
| 3,693,457 A | * | 9/1972 | Pilat | ............................. | 73/865.5 |
| 3,724,825 A | * | 4/1973 | Streck | ......................... | 261/95 |
| 3,751,271 A | * | 8/1973 | Kimura et al. | ................. | 501/85 |
| 4,821,700 A | * | 4/1989 | Weibler et al. | ............... | 123/494 |
| 5,564,067 A | * | 10/1996 | Hendricks | ................... | 428/566 |
| 6,182,502 B1 | | 2/2001 | Schwegler et al. | | |
| 2003/0070751 A1 | * | 4/2003 | Bergevin et al. | ............ | 156/297 |
| 2003/0070752 A1 | * | 4/2003 | Bergevin et al. | ............ | 156/297 |

FOREIGN PATENT DOCUMENTS

| | | | |
|---|---|---|---|
| DE | 3426571 A1 | * | 2/1985 |
| EP | 322993 A2 | * | 7/1989 |
| GB | 2159729 A | * | 12/1985 |
| RU | 2088318 C1 | * | 3/1995 |

* cited by examiner

*Primary Examiner*—Hezron Williams
*Assistant Examiner*—John Fitzgerald
(74) *Attorney, Agent, or Firm*—Jeffrey T. Knapp

(57) ABSTRACT

A reference leak includes a leak layer formed of one of a metallic material, a glass material, and a ceramic material. The metallic material is selected from the group consisting of copper, nickel, and molybdenum. The leak layer comprises a number of substantially parallel leak through holes defined therein. The leak through holes may be cylindrical holes or polyhedrical holes. A length of each of the leak through holes is preferably not less than 20 times a diameter thereof. A diameter of each of the leak through holes is generally in the range from 10 nm to 500 nm. A length of each of the leak through holes is generally in the range from 100 nm to 100 μm. A leak rate of the reference leak is in the range from $10^{-8}$ to $10^{-15}$ torx l/s. The leak through holes have substantially same length and diameter.

6 Claims, 2 Drawing Sheets

REFERENCE LEAK

BACKGROUND OF THE INVENTION

1. Field of the Invention

The present invention relates to detecting instruments for use in leak detection of a gas, particularly to a reference leak.

2. Discussion of the Related Art

A reference leak is an artificial instrument for use in leak detection of a specific gas. The reference leak has a constant leak rate for the specific gas under a given condition such as a specific temperature and a specific pressure at the gas intake side. The reference leak has been widely used in periodical leak detection and calibration of a helium mass spectrometer leak detector.

Conventional reference leaks can generally be classified into the three types: platinum wire-glass leaks, squeezed metal tube leaks, and silica membrane helium leaks. A leak rate of the platinum wire-glass leak is generally in the range from $10^{-6} \sim 10^{-8}$ torr·l/s. The platinum wire-glass leak is obtained by implanting a platinum wire into a glass body by way of a glass-to-metal unmatched sealing method. Due to a coefficient of thermal expansion of the platinum wire being unmatched with that of the glass body, a plurality of leak gaps are then defined at an interface between the platinum wire and the glass body. The platinum wire-glass leak is then obtained. However, during the manufacturing process of the platinum wire-glass type leak, the leak gaps' shapes, sizes, and numbers are randomly formed and therefore cannot be artificially controlled. A leak rate of the reference leak has to be calibrated by other reference calibration instruments after the reference leak is manufactured. Additionally, the leak rate of the reference leak is sensitive to temperatures. The leak rate may vary due to a change of the number and distribution of the leak gaps as a result of a change of the temperature. This temperature dependence may cause uncertainties (i.e., potential for an increased margin of error) with respect to the leak rate of the platinum wire-glass leak.

The squeezed metal tube leak is generally obtained by punching a tube of an oxygen free copper into a flattened piece by a hydraulic pressure device. The squeezed metal tube comprises a plurality of leak gaps, the leak gaps functioning as leak channels for the gas. A leak rate of the squeezed metal tube type reference leak is generally in the range from $10^{-6} \sim 10^{-8}$ tor·l/s. However, similar to the platinum wire-glass leak, shapes, sizes, and numbers of the leak gaps of the squeezed metal tube leak are also formed randomly making such leak gaps unpredictable and therefore artificially uncontrollable.

The silica membrane helium leak is generally in a form of a blown bubble. The blown bubble is generally a thin, spherical membrane formed of silica glass. The silica glass membrane is porus and allows helium (He) gas to pass therethrough while blocking other kinds of gases from passing therethrough. Likewise, a leak rate of such a reference leak is unpredictable and has to be calibrated by other reference calibration instruments. The leak rate of the reference leak is also sensitive to temperatures.

Therefore, a heretofore unaddressed need exists in the industry to address the aforementioned deficiencies and inadequacies with respect to reference leaks and their method of manufacture, in particular.

SUMMARY

In one aspect of the present invention, there is provided a method for making a reference leak. The method comprises the steps of: (a) preparing a substrate; (b) forming a patterned catalyst layer on the substrate, the patterned catalyst layer comprising one or more catalyst blocks; (c) forming one or more predominantly one-dimensional, elongated nano-structures extending from the corresponding catalyst blocks, such elongate nano-structures being formed by a chemical vapor deposition method; (d) forming a leak layer of one of a metallic material, a glass material, and a ceramic material on the substrate, the one or more elongate nano-structures being partly or completely embedded in the leak layer; and (e) removing the one or more elongate nano-structures and the substrate to obtain a reference leak with one or more leak holes defined therein.

The substrate may be a silicon substrate. A crystal plane orientation of the silicon may be selected from the group consisting of (111), (110), and (100) crystal plane orientations. The patterned catalyst layer generally comprises a material selected from the group consisting of gold, iron, cobalt, and silver. A thickness of the patterned catalyst layer is generally in the range from 0.2 nm to 10 nm. The thickness of the patterned catalyst layer is preferably approximately 1 nm. A size (i.e., diameter) of the catalyst block is preferably less than 1 μm. The catalyst layer may be formed by an evaporation deposition method, a sputtering deposition method, or an electroplating method. The catalyst layer may be patterned by a photolithography method or by an electron beam etching method. The patterned catalyst layer may also be formed by a printing method.

The elongate nano-structures are, advantageously, generally selected from the group consisting of silicon nanowires, silicon dioxide nanowires, gallium nitride nanowires, indium phosphide nanowires, and zinc oxide nanowires. A length of the elongate nano-structure is generally in the range from 100 nm to 100 μm. A diameter or width of the elongate nano-structure is generally in the range from 10 nm to 500 nm.

The metallic material used for the leak layer may, advantageously, be selected from the group consisting of copper, nickel, and molybdenum, and alloys composed substantially of one or more of these metals. The leak layer may be formed, e.g., by one of an evaporation deposition method, a sputtering deposition method, an electroplating method, a chemical vapor deposition method and a metal organic chemical vapor deposition method. The one or more elongate nano-structures may later be effectively removed by one of a reactive ion etching method, a wet etching and a plasma etching method, for example.

In another aspect of the present invention, there is a provided a method for making a reference leak having a custom-tailored leak rate for use in leak detection of a gas. The method includes the steps of:

(a) forming one or more elongate nano-structures on a substrate, a diameter and a length of the one or more elongate nano-structures being predetermined according to the following equations:

$$Q = n \times (P1 - P2) \times Y \quad (1)$$

$$Y = 12.1 \times \sqrt{29/M} \times \sqrt{T/293} \times (D^3/L) \quad \text{(Knusen equation) (2)}$$

wherein,

Q represents the custom-tailored leak rate, n represents the number of the elongate nano-structures, P1 represents a pressure of the gas intake side of the reference leak, P2 represents a pressure of the gas outlet side of the reference leak, Y represents a conductance of the reference leak, M represents a molecular weight of the gas, T represents an operational temperature, D represents a diameter of the one or more elongate nano-structures, and L represents a length of the one or more elongate nano-structures;

(b) forming a leak layer of one of a metallic material, a glass material, a composite material, and a ceramic material on the substrate with the one or more elongate nano-structures embedded therein; and (c) removing the one or more elongate nano-structures and the substrate to obtain a reference leak with one or more corresponding leak holes defined therein.

A length of each of the elongate nano-structures is preferably not less than 20 times a diameter thereof.

In still another aspect of the present invention, there is provided a method for making a reference leak. The method comprises the steps of: (a) forming one or more elongate nano-structures on a substrate; (b) forming a leak layer of one of a metallic material, a glass material, a composite material, and a ceramic material on the substrate with the one or more elongate nano-structures partly or completely embedded therein; and (c) removing the one or more elongate nano-structures and the substrate to obtain a reference leak with one or more corresponding leak holes defined therein.

Other advantages and novel features will become more apparent from the following detailed description when taken in conjunction with the accompanying drawings, in which:

BRIEF DESCRIPTION OF THE DRAWINGS

Many aspects of the invention can be better understood with reference to the following drawings. The components in the drawings are not necessarily to scale, the emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Reference will now be made to the drawings to describe a preferred embodiment of the present invention in detail.

Figure 6:
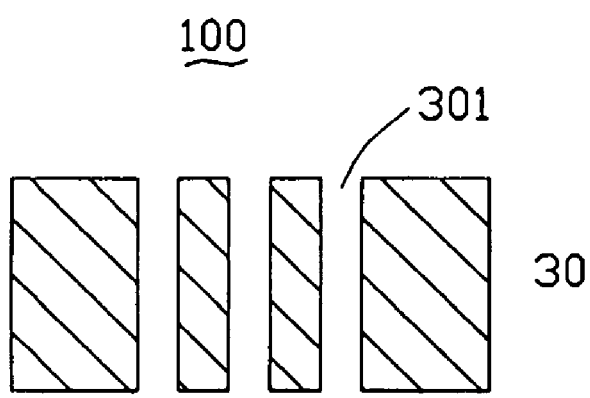
FIG. 6 is a schematic cross-sectional view showing the reference leak according to a preferred embodiment of the present invention.

Referring initially to FIG. 6, a reference leak 100 made by a process according to the preferred embodiment of the present invention is shown. The reference leak 100 comprises a leak layer 30, and a plurality of leak through holes 301 defined in the leak layer 30.

The leak layer 30 is, advantageously, generally formed of one of a metallic material, a glass material, a composite material, and a ceramic material. The metallic material, if chosen, may usefully be selected from the group consisting of copper, nickel, and molybdenum, and alloys composed substantially of at least one of such metals. The material of the leak layer 30 is selected depending on the specific kind of a gas which the reference leak is utilized to detect. For instance, if the reference leak 100 is utilized to detect He gas, the material of the leak layer 30 is preferably a metallic material, because the metallic material is impermeable to He gas. If the reference leak is utilized to detect air, oxygen ($O_2$) gas, or argon (Ar) gas, the material of the leak layer 30 is preferably a glass material or a ceramic material, because the glass material and the ceramic material are impermeable to air, $O_2$ gas, and/or Ar gas.

The leak through holes 301 may be shaped as cylindrical holes or polyhedral holes. The number of the leak through holes 301 may be custom-tailored. In other words, the number of the leak through holes 301 may be predetermined prior to making the reference leak 100. Preferably, the leak through holes 301 have substantially same length L and diameter D, and are substantially parallel to each other. Likewise, a shape, a length, and a diameter of each of the leak through holes 301 may also be custom-tailored and, thereby, predetermined prior to making the reference leak 100. The length L and the diameter D of each of the leak through holes preferably satisfy the following requirement: $L \geqq 20\,D$. The diameter of each of the leak through holes 301 is generally in the range from 10 nm to 500 nm. The length of each of the leak through holes 301 is generally in the range from 100 nm to 100 μm. A leak rate of the reference leak 100 is generally in the range from $10^{-15}$ to $10^{-18}$ tor·l/s. The reference leak 100 can be employed, for example, in leak detection and calibration of a helium mass spectrometer, in measurement of pumping speed of micro vacuum pump, and in supplying a mircoflow gas in experiments in the field of gas-solid interface technology.

Referring now to FIGS. 1-5, the process for making a reference leak 10 according to a preferred embodiment of the present invention is shown. The process includes the steps of:

(a) forming one or more elongate nano-structures 11 on a substrate 1;

(b) forming a leak layer 3 of one of a metallic material, a glass material, and a ceramic material on the substrate 1 with the one or more elongate nano-structures 11 partly or completely embedded therein; and (c) removing the one or more elongate nano-structures 11 and the substrate 1 to obtain a reference leak 10 with one or more corresponding leak holes 31 defined therein, each leak hole being defined by a space previously occupied by one elongate nano-structure.

If the reference leak 10 has a custom-tailored leak rate, a diameter and a length of each of the one or more elongate nano-structures 11 can be predetermined according to the given custom-tailored leak rate, which will be explained in detail below.

Figure 1:
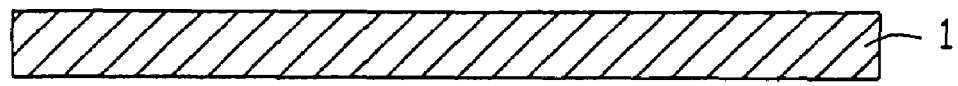
FIGS. 1-5 are schematic, cross-sectional views showing successive stages in a method for making a reference leak, according to an exemplary embodiment of the present invention.

In step (a), referring to FIG. 1, a substrate 1 is prepared. The substrate 1 generally is a silicon substrate. A crystal plane orientation of the silicon substrate 3 is advantageously selected from the group consisting of (111), (110), and (100) crystal plane orientations. In the illustrated embodiment, the crystal plane orientation of the silicone substrate is a (111) crystal plane orientation.

Figure 2:
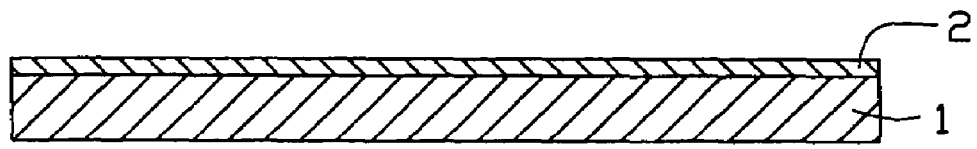

Referring to FIG. 2, a catalyst layer 2 is formed on the substrate 1 by, e.g., an evaporation deposition method, a sputtering deposition method, or an electroplating method. The catalyst layer 2 generally is composed of a material selected from the group consisting of gold, iron, cobalt, and silver, or an alloy composed substantially of least one of such metals. In the illustrated embodiment, the catalyst layer 2 is a layer of gold. The catalyst layer 2 is then patterned, for example, by a photolithography method or an electron beam etching method. Alternatively, the patterned catalyst layer is formed by a printing method. A thickness of the patterned catalyst layer 2 is generally in the range from 0.2 nm to 10 nm. Preferably, the thickness of the patterned catalyst layer is approximately 1 nm. The patterned catalyst layer 2 includes one or more catalyst blocks 21. Each catalyst particle 21 is located at a respective chosen site at which a given elongate nano-structure 11 is desired to be formed. A size of the catalyst block 21 is preferably less than 1 µm. Each of the catalyst blocks 21 is transformed into a single catalyst particle in a later growth process with only one elongate nano-structure 11 (see FIG. 3) being grown therefrom. A shape of the catalyst particle 21 may be round or polygonal.

Figure 3:
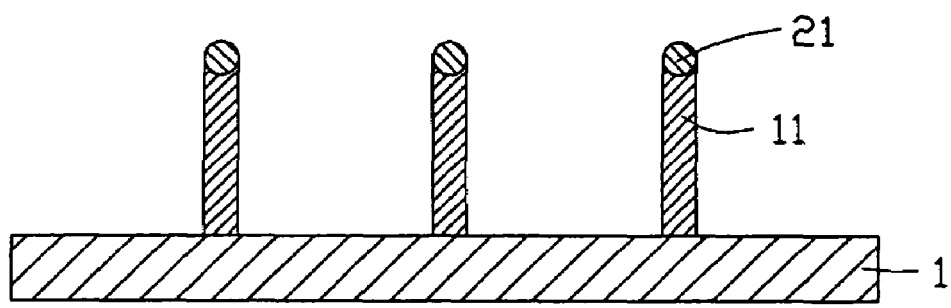

Referring to FIG. 3, the treated substrate 1, together with the catalyst particles 21, is placed in a reactive chamber (not shown) for performing a chemical vapor deposition (CVD) method. A gas containing silicon (for example, a $SiCl_4$ gas) is introduced into the reactive chamber. A temperature in the reactive chamber is elevated and maintained in the range from 700° C. to 900° C. With the aid of the catalyst, one or more elongate nano-structures 11 are thus formed extending from the corresponding catalyst particles 21. In the illustrated embodiment, the elongate nano-structures 11 are silicon nanowires 11. The silicon nanowires 11 are cylindrical and extend perpendicularly from the substrate 1. Due to the size of the catalyst particle being less than 1 µm, the length and the diameter of the silicon nanowire 11 can be artificially controlled by deliberately adjusting the thickness of the catalyst layer 2, the concentration of ambient air, the growing temperature, and the growing time of the silicon nanowires 11, etc. Alternatively, the elongate nano-structures 11 may also, for example, be selected from the group consisting of silicon dioxide nanowires, gallium nitride nanowires, indium phosphide nanowires, and zinc oxide nanowires. A length of the elongate nano-structure 11 is generally in the range from 100 nm to 100 µm. A diameter (the term being intended to broadly incorporate width, if polyhedral in cross-section, as well as the standard meaning of "diameter" to simplify terminology) of the elongate nano-structure 11 is in the range from 10 nm to 500 nm. Likewise, the length and the diameter of the elongate nano-structure 11 may also be artificially controlled by deliberately adjusting the size of the catalyst particle 21, the concentration of ambient air, the growing temperature, and the growing time of the elongate nano-structures 11. For facilitating the creation of the leak layer 3 at a later time, the silicon nanowires 11 are preferably oxidized into silicon dioxide nanowires 11. The length of the silicon nanowires 11 is preferably 20 times the diameter thereof, for ensuring that an error of a leak rate of the resultant reference leak is less than about 5%. (It is to be understood, that while CVD may be the current preferred method for forming nano-structures 11, other deposition techniques may be employed for the formation of such nano-structures 11 and still be considered to be within the scope of the present invention.)

Figure 4:
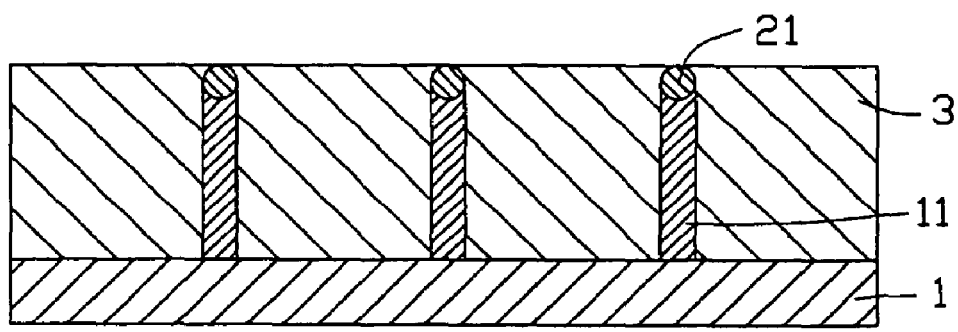

In step (b), referring to FIG. 4, a leak layer 3 is formed on the substrate 1 with the one or more elongate nano-structures 11 partly or completely embedded therein. The leak layer 3 may be formed, e.g., by an evaporation deposition method, a sputtering deposition method, an electroplating method, a chemical vapor deposition method and/or a metal organic chemical vapor deposition method. The leak layer 3 may comprise a metallic material, a glass material, a composite material, or a ceramic material. As stated above, the material of the leak layer 30 is selected depending on the specific kind of a gas that the reference leak 10 is utilized to detect. In the illustrated embodiment, because the reference leak is utilized to detect leakage of a He gas, the leak layer 3 is comprised of a metallic material, such as copper, nickel, and molybdenum, or an alloy thereof. A top portion of the leak layer 3 may be trimmed mechanically or by an electrochemical polishing process such that tip portions of the trimmed silicon nanowires 11 are flush with a top portion of the trimmed leak layer 3, with the length of the silicon nanowires 11 still being maintained so as to be at least 20 times the diameter thereof.

Figure 5:
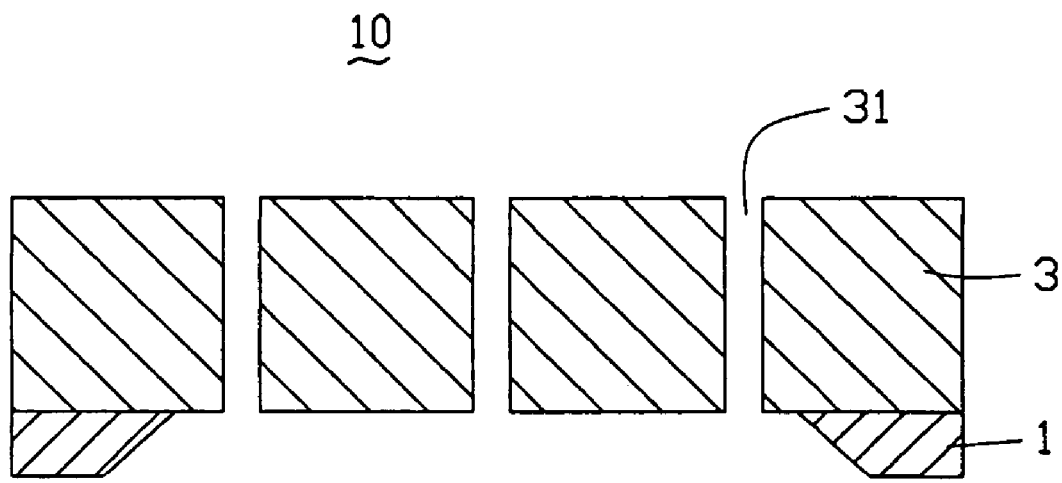

In step (c), referring to FIG. 5, the one or more elongate nano-structures 11, i.e., the silicon nanowires 11, and the substrate 1 are then removed to obtain a reference leak 10 with one or more leak holes 31 defined therein. In the illustrated embodiment, the silicon nanowires 11 and the substrate 1 are removed by a reactive ion etching method, while the leak layer 3 (i.e. the metallic layer 3) remains intact. In another exemplary embodiment, the one or more elongate nano-structures 11 may be removed by a wet etching or a plasma etching method. Thus, the reference leak 10 is obtained. Obviously, each of the leak through holes 31 has a same diameter as the silicon nanowires 11. The length of each of the leak through holes is equal to the length of the silicon nanowires 11. The number of the leak through holes 31 is equal to the number of the silicon nanowires 11. The leak through holes 31 extend perpendicularly from the substrate 1 and are parallel to each other.

If the leak rate of the reference leak is custom-tailored, the length and the diameter of the elongate nano-structure can also be predetermined prior to making the reference leak according to the following equations:

$$Q = n \times (P_1 - P_2) \times Y \quad (1)$$

$$Y = 12.1 \times \sqrt{29/M} \times \sqrt{T/293} \times (D^3/L) \quad \text{(Knusen equation) (2)}$$

wherein,

Q represents the custom-tailored leak rate in units of torr times liter per second (Torr·L/s), n represents the number of the elongate nano-structures, where n is a natural number, $P_1$ represents a pressure of the gas intake side of the reference leak in units of torrs, $P_2$ represents a pressure of the gas outlet side of the reference leak in units of torrs, Y represents a conductance of the reference leak in units of liter per second (L/s), M represents a molecular weight of the gas, T represents an operational absolute temperature in units of Kelvins, D represents a diameter of the one or more elongate nano-structures in units of centimeters, and L represents a length of the one or more elongate nano-structures in units of centimeters.

Further, the length L and the diameter D of the elongate nano-structures satisfy the following requirement:

$$L \geq 20D \quad (3)$$

In the illustrated embodiment, the reference leak 10 is used to detect leakage of He gas. If a pressure of He gas $P_1$ is the standard atmospheric pressure, i.e. 760 torrs, the temperature T is equal to 293 K, and a mean free path of He gas $\lambda_{He}$ is satisfied with the following requirement:

$$\lambda_{He} > 50 \text{ nm} \quad (4),$$

and $$\lambda_{He} > (1/3) \times D \quad (5),$$

the equation (2) can thus be simplified as follows:

$$Y = 12.1 \times \sqrt{29/M} \times (D^3/L) \quad (6)$$

In an exemplary embodiment, if L=5 μm, D=100 nm, $P_1$=760 torrs, $P_2$=0 torr, n=1, M=4 (the molecular weight of He is equal to 4 g/mol), and T=293 K, the conductance of the reference leak Y can be obtained according to the equation (6):

$$Y=12.1\times\sqrt{29/4}\times((10^{-5})^3/5\times10^{-4})\approx6.51\times10^{-11}\ L/s.$$

The leak rate Q of the reference leak can be obtained according to the equation (1):

$$Q=(760-0)\times0.6.51\times10^{-11}\approx4.95\times10^{-8}\ Torr\cdot L/s$$

In this case, if $P_1$=1 torr, can reach up to $6.51\times10^{-11}$ Torr·L/s. On the contrary, understandably, according to the custom-tailored the leak rate Q of the reference leak 10, the length, the diameter, and the number of the leak through holes can be predetermined according to the aforementioned equations prior to making the reference leak 10.

It is to be further understood that the above-described embodiments illustrate the scope of the invention but do not restrict the scope of the invention. Variations may be made to the embodiments without departing from the spirit or scope of the invention as claimed herein.

What is claimed is:

1. A reference leak having a custom-tailored leak rate for use in leak detection of a gas, the reference leak comprising:
    a leak layer formed of one of a metallic material, a glass material, a composite material, and a ceramic material, the leak layer comprising one or more leak through holes defined therein, a diameter and a length of each of the leak through holes being calculated according to the following equations:

$$Q=n\times(P_1-P_2)\times Y \quad (1)$$

$$Y=12.1\times\sqrt{29/M}\times\sqrt{T/293}\times(D^3/L) \quad (2)$$

wherein,
    Q represents a custom-tailored leak rate,
    n represents a number of leak through holes,
    $P_1$ represents a pressure of a gas intake side of the reference leak,
    $P_2$ represents a pressure of a gas outlet side of the reference leak,
    Y represents a conductance of the reference leak,
    M represents a molecular weight of the gas to be detected using the reference leak,
    T represents an operational temperature,
    D represents one of a width and a diameter of the one or more leak through holes, and
    L represents a length of the one or more leak through holes.

2. The reference leak as described in claim 1, wherein a set of dimensions of each of the leak through holes satisfy the following requirement: L≧20 D.

3. The reference leak as described in claim 1, wherein the leak layer is composed of a metallic material, the metallic material being selected from the group consisting of copper, nickel, and molybdenum, and alloys comprised substantially of at least one of such metals.

4. The reference leak as described in claim 1, wherein the reference leak is configured such that a leak rate thereof is about in the range from $10^{-8}$ to $10^{-5}$ tor·l/s.

5. The reference leak as described in claim 1, wherein the diameter of each of the leak through holes is in the approximate range from 10 nm to 500 nm.

6. The reference leak as described in claim 1, wherein the length of each of the leak through holes is about in the range from 100 nm to 100 μm.

* * * * *